United States Patent
Albers et al.

(10) Patent No.: US 12,534,888 B2
(45) Date of Patent: Jan. 27, 2026

(54) WATER SUPPLY SYSTEM WITH CROSS-FEED LINK AND AIRCRAFT HAVING A WATER SUPPLY SYSTEM

(71) Applicant: Airbus Operations GmbH, Hamburg (DE)

(72) Inventors: Frederik Albers, Hamburg (DE); Frank Schneider, Hamburg (DE); Hannes Müller, Hamburg (DE); Axel Schreiner, Hamburg (DE); Tim Lübbert, Hamburg (DE); Michael Rempe, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 183 days.

(21) Appl. No.: 18/493,884

(22) Filed: Oct. 25, 2023

(65) Prior Publication Data
US 2024/0141630 A1   May 2, 2024

(30) Foreign Application Priority Data
Oct. 27, 2022 (EP) .................................... 22204136

(51) Int. Cl.
*E03B 7/07* (2006.01)
*E03B 1/02* (2006.01)

(52) U.S. Cl.
CPC ............... *E03B 7/078* (2013.01); *E03B 1/02* (2013.01); *E03B 7/075* (2013.01)

(58) Field of Classification Search
CPC . E03B 7/078; E03B 7/02; E03B 7/071; E03B 7/075; E03B 5/00; B64D 11/04
See application file for complete search history.

(56) References Cited

U.S. PATENT DOCUMENTS

| 5,309,938 | A | * | 5/1994 | Ellgoth | .................. | B64D 11/00 |
| | | | | | | 137/341 |
| 8,074,933 | B2 | | 12/2011 | Mackulin et al. | | |
| 10,822,774 | B2 | * | 11/2020 | Lübbert | .................. | B64D 11/02 |

(Continued)

FOREIGN PATENT DOCUMENTS

DE  4225950 A1  2/1994

OTHER PUBLICATIONS

European Search Report for corresponding European Patent Application No. 22204136 dated Mar. 15, 2023; priority document.

*Primary Examiner* — Reinaldo Sanchez-Medina
(74) *Attorney, Agent, or Firm* — Greer, Burns & Crain, Ltd.

(57) ABSTRACT

A water supply system for a plurality of water consumer units in an aircraft. The system includes a main tank configured to store a main supply of water, a main water pipe connected to an outlet of the main tank, and a plurality of water networks, each configured to conduct water from the main tank to at least one of the plurality of water consumer units. The plurality of water consumer units is partitioned in a first group of water consumer units and at least a second group of water consumer units. Each of the plurality of water networks includes a conveying device configured to convey water to each water consumer unit of one of the groups. The water supply system further includes a cross-feed valve configured to fluidically connect or separate the plurality of water networks downstream of the conveying devices in the plurality of water networks.

12 Claims, 3 Drawing Sheets

(56) References Cited

U.S. PATENT DOCUMENTS

| | | | | |
|---|---|---|---|---|
| 2012/0186654 | A1 | 7/2012 | Dannenberg et al. | |
| 2014/0123383 | A1* | 5/2014 | Detjen | B64D 11/02 |
| | | | | 4/670 |
| 2019/0063046 | A1 | 2/2019 | Alps et al. | |
| 2020/0326259 | A1* | 10/2020 | Maroju | B64D 11/04 |
| 2021/0372095 | A1* | 12/2021 | Whitelaw | E03B 7/077 |

\* cited by examiner

WATER SUPPLY SYSTEM WITH CROSS-FEED LINK AND AIRCRAFT HAVING A WATER SUPPLY SYSTEM

CROSS-REFERENCES TO RELATED APPLICATIONS

This application claims the benefit of the European patent application No. 22204136.0 filed on Oct. 27, 2022, the entire disclosures of which are incorporated herein by way of reference.

FIELD OF THE INVENTION

The present disclosure generally relates to water supply systems in an aircraft. Specifically, the present disclosure relates to a water supply system having at least two groups of water consumers with a corresponding number of water networks that are connected by a cross-feed valve, as well as an aircraft having such a water supply system.

Currently, potable water in an aircraft is provided to water consumers, such as a faucet, a toilet or a galley, in a pressurized water network. In order to avoid a failure of all water consumers at once, at least two water networks are installed supplying pressurized water to respective water consumers.

However, separate water networks increase the overall weight of the water supply system in the aircraft, for example, due to separate conveying devices for each water network. Thus, a trade-off between redundancies and weight comes with such water supply systems.

BACKGROUND OF THE INVENTION

It is therefore an object of the present disclosure to improve current water supply systems.

SUMMARY OF THE INVENTION

According to a first aspect to better understand the present disclosure, a water supply system for a plurality of water consumer units in an aircraft comprises a main tank configured to store a main supply of (potable) water, a main water pipe connected to an outlet of the main tank, and a plurality of water networks, each configured to conduct water from the main tank to at least one of the plurality of water consumer units. The plurality of water consumer units is partitioned in a first group of water consumer units and at least a second group of water consumer units. Thus, the plurality of water consumer units can be provided with water, such as potable water, from a main tank. The grouping of the water consumers allows controlling redundancies in the aircraft. For instance, in case of a plurality of lavatories, each group of water consumers can comprise at least one lavatory, in order to still provide a lavatory even if one of the water networks fails.

Furthermore, each of the plurality of water networks comprises a conveying device configured to convey water to each water consumer unit of one of the groups. In other words, the water consumer units of one of the groups is supplied with water through one water network.

The water supply system further comprises a cross-feed valve configured to fluidically connect or separate the plurality of water networks downstream of the conveying devices in the plurality of water networks. The cross-feed valve can be in an open position or a closed position, wherein a fluid connection is achieved between the plurality of water networks, when the cross-feed valve is in the open position, and a fluid separation of the plurality of water networks (the pipes of each network) is achieved, when the cross-feed valve is in the closed position.

In an implementation variant, the cross-feed valve can comprise one shut-off valve, wherein a first port of the valve is fluidically connected to a pipe of a first one of the plurality of water networks and a second port of the valve is fluidically connected to a pipe of a second one of the plurality of water networks. A port of the (cross-feed) valve is to be understood as an inlet or an outlet of the valve, wherein the actual shutoff member of the valve is arranged between the two ports of the valve, i.e., between the inlet and the outlet of the valve. The use of a single shutoff valve simplifies the overall water supply system, facilitates a simple piping or ducting, and allows avoidance of dead ends in the piping or ducting.

In another implementation variant, the system can comprise one cross-feed valve for each pair of water networks. This allows fluidly connecting all water networks with one another, particularly if more than two water networks are present in the system. This may include one cross-feed valve for each possible pair of water networks, or a number of cross-feed valves corresponds to the number of furcations (that is, branches or forks) from the main water pipe.

In a further implementation variant, each of the pipes of the first and second water network at the respective first and second port of the valve can run in an at least partially vertical direction allowing water to drain from the respective pipe by gravity. In other words, the pipes of the first and second water network adjacent to the cross-feed valve are installed in the system in a manner that the pipes of both networks are substantially vertical to allow draining the pipes by gravity. As a mere example, the pipes of the first and second water network, where the valve fluidly connects both pipes, are installed in a direction having a vertical component sufficiently steep for water to run by gravity.

Alternatively or additionally, the pipes of the first and second water network adjacent to the cross-feed valve are installed in the system in a manner that allows draining the pipes pneumatically. In other words, blowing air through the pipes pushes the water out of the pipe. Such arrangement allows a more horizontally arranged pipe compared to draining the pipe by gravity. It is to be understood that at least one of the pipes adjacent to the valve can be arranged horizontally.

Draining the water from the pipe/s can further be facilitated by providing pipes of small inner diameter (water conducting area). A small inner diameter means a diameter in the range of 1 mm to 10 mm, preferably 2 mm to 6 mm, most preferably 4 mm. This further reduces the overall weight of the water supply system.

Also alternatively or additionally, the cross-feed valve can be installed in the system in a manner that the valve drains by gravity. As a mere example, the cross-feed valve can have an inlet port and an outlet port, and both ports are arranged with a height difference, i.e., the valve is arranged in a direction having a vertical component. In other words, the cross-feed valve itself is arranged at least partially vertical.

In yet a further implementation variant, each of the pipes of the first and second water network can be directly connected to the respective first and second port of the valve substantially without forming a dead-end pipe when the valve is closed. Substantially without forming a dead-end pipe means that the pipe of the first or second water network is directly connected to the respective port of the valve, so that no extra pipe or duct is required, which would otherwise form a dead end. It is to be understood that the direct connection between the pipe of the first or second water network and the respective port may include a short fitting or nipple, which is fluidly connected to the respective port of the valve. The short fitting or nipple may be implemented as a T-shaped fitting, wherein the branch of the T-shaped fitting directed to the port of the valve has a minimum possible length.

In any case, the cross-feed valve connects the pipe branches of the respective water network without an actual furcation towards the cross-feed valve. In other words, the distance between the respective pipe and the shutoff member of the cross-feed valve is kept to a minimum, so that a dead end in the water network is substantially avoided. This prevents or at least significantly reduces any build-up of bacteria or the like, so that hygienic standards can be met. In addition, the flow of water through the respective pipe branch is not (significantly) deteriorated.

As a mere example, a pipe of the first and second water network may be provided with an opening in the skin or shell of the pipe, to which the port of the valve is fluidly connected, such as welded, adhered or the like. Alternatively or additionally, the shortest possible (T-shaped) fitting is attached to the pipe in a fluid tight manner.

In another implementation variant, the system can further comprise a controller configured to control the plurality of conveying devices and the cross-feed valve. For example, the controller may be connected with each of the conveying devices and the cross-feed valve by a signal, data and/or electric line, through which a corresponding signal is transmitted to control the respective conveying device or valve. It is to be understood that the conveying devices and the cross-feed valve are further configured to receive such signal and to change their operating state. As a mere example, the controller may set a conveying speed of one or more of the conveying devices and/or may set an opening degree of the cross-feed valve (wherein a closed valve corresponds to an opening degree of zero). The conveying devices and/or valve may either be equipped with a corresponding controller and/or motor to respond to the received signal.

Alternatively or additionally, the conveying devices and/or valve may be directly controlled by the controller, such as by a corresponding voltage or current provided by the controller to a motor or drive of a conveying device and/or valve.

In yet another implementation variant, the system can further comprise at least one sensor configured to determine a water supply requirement of at least one of the plurality of water consumer units and to transmit a signal indicating the water supply requirement to the controller. Such water supply requirement may correspond to a water level in a buffer tank of the respective water consumer unit, so that the controller may convey water to the water consumer unit to fill the buffer tank. Another water supply requirement may be measured by a sensor of a faucet or lavatory flushing system, indicating an opening degree of the faucet or flushing system corresponding to the amount of water required by the faucet or flushing system per unit time. The controller may then control conveying of a corresponding amount of water through the respective water network to the water consumer unit.

In a further implementation variant, the controller can further be configured to control the cross-feed valve and one or more of the conveying devices in a particular manner.

According to a first exemplary operating manner, the controller may close the cross-feed valve and operate each of the plurality of conveying devices in a normal mode. A normal mode of a conveying device means that the conveying device is set to convey an amount of water currently required by the respective water network. The amount of water currently required by a water network means a sum of required water amounts of all water consumer units of the respective water network. This required amount of water may be predefined or may be set in dependence on sensor measurements. This operating manner reflects the operation in the majority of the cases, i.e., when the water supply system operates in a normal manner.

According to a second exemplary operating manner, the controller may open the cross-feed valve and operate one of the plurality of conveying devices, to convey water to each of the water networks. This operating mode allows saving energy by operating only one conveying device. This operating mode may be applicable in case a reduced amount of water is required by all water consumer units of one water network or even all water consumer units of more than one water network (or all water networks). The reduced amount of required water can be determined, for example, if all buffer tanks of the water consumer units have reached a minimum fill level, and particularly when a maximum fill level in all buffer tanks has been reached.

In addition, this operating mode can also be used, if one of the conveying devices fails or erroneously cannot convey the required amount of water.

According to a third exemplary operating manner, the controller may open the cross-feed valve and operate each of the plurality of conveying devices at a maximum conveying power, when a maximum water supply requirement is determined at one of the plurality of water consumer units. This operating mode can be referred to as a boost function. Such boost function may be necessary at the start-up of the system. For instance, at the beginning of each mission/flight, the buffer tanks of the water consumer units, particularly a large buffer tank of a galley, have to be filled up in a short time period. Since the lavatories are usually not in use at this time (e.g., no passengers are on board), the maximum conveying power may be used to fill up the buffer tanks. Furthermore, one of the water networks may include a greater number of galleys than another water network. In this case, the boost function may be used to provide more water to the one water network including more galleys. Furthermore, the boost function is likewise applicable, if it is determined that one or more water networks require more water than other water networks. For instance, it may occur that a specific passenger behavior leads to a more frequent use of certain lavatories than other lavatories. Employing the boost function, the buffer tanks of the more frequently used lavatories can be refilled faster. Alternatively or additionally, the water network architecture may require employing the boost function. Due to longer pipes or different pipe diameters an associated water network may require more water than is conveyable by only the conveying device of this particular water network.

According to a fourth exemplary operating manner, the controller may open the cross-feed valve and operate at least one of the plurality of conveying devices, in order to perform a cross-check of sensors in the water networks. For instance, a comparison of sensor measurement (flow, pressure or the like) from one water network (sub-system) with another water network (sub-system) may be performed by conveying water with different conveying devices, one at a time. It is likewise possible that leak detection may fail in one of the water networks due to a sensor failure. By opening the cross-feed valve, such leak detection may still be performed in this operating mode.

According to a fifth exemplary operating manner, the controller may close the cross-feed valve, if a leakage is determined in one of the water networks. In other words, one water network, where a leakage has been detected, can be isolated from the entire water supply system. The remaining water networks and associated water consumer units can still be used. The cross-feed valve even allows using the conveying device usually associated with the water network having the leakage for any other water network. In the latter case, a shut-off valve in the leaking water network downstream of the cross-feed valve facilitates this use of the conveying device.

According to a sixth exemplary operating manner, the controller may open the cross-feed valve in a system comprising more than one main tank, such as a dual water supply system having one main tank for one or more water networks on one side of the aircraft (e.g., left side or front) and having one main tank for one or more water networks on another side of the aircraft (e.g., right side or back). In this case, the controller may control the cross-feed valve and/or a conveying device to convey water to each of the water networks in such a manner that both main tanks will have an equal water level and/or from one main tank to another main tank.

Furthermore, in such a dual water supply system, draining the water from the water networks may be achieved pneumatically. In this case, the cross-feed valve should initially be closed in order to drain each side of the system individually. Towards the end of the drainage process, the cross-feed valve can be opened in order to achieve a targeted pneumatic drainage of the valve and the cross-feed link. This achieves a minimal residual water after draining and, hence, a minimal risk of freezing/blocking the associated pipes and valves.

In yet a further implementation variant, the system can further comprise at least one furcation dividing the main water pipe in a plurality of pipe branches. Each of the plurality of water networks branches off the main water pipe at one of the at least one furcation. In addition, each conveying device can be arranged in a respective one of the pipe branches downstream of a respective one of the at least one furcation. In other words, each water network begins at an associated furcation and has one conveying device.

A furcation can simply be implemented as at least one T-shaped fitting dividing the main water pipe into at least two branches. It is to be understood that any kind of branch-off may be implemented to form a furcation.

In case of more than two pipe branches and, hence, more than two water networks, the system can comprise one cross-feed valve for each pair of water networks. In other words, a system with N pipe branches (i.e., N water networks) can have N−1 cross-feed valves.

According to a second aspect to better understand the present disclosure, an aircraft comprises the water supply system according to the first aspect or one of its variants.

In an implementation variant, the plurality of water consumer units can comprise one or more lavatories and one or more galleys of the aircraft. The lavatories and/or galleys may be distributed throughout the water networks. In other words, each water network can comprise one or more lavatories and/or one or more galleys.

In another implementation variant, when the water supply system comprises the controller, the water supply system can further comprise an aircraft data network configured to communicate with the controller. The aircraft data network may be a data network receiving and/or collecting sensor data of particular units of the aircraft, such as the water consumer units of the water supply system. As a mere example, the aircraft data network may be equipped and/or connected with sensors indicating whether a washroom is occupied or available, whether a faucet is in use, whether a flushing system of a lavatory is in use, whether galley components are in use (particularly galley components requiring water), and/or indicating a water level of a buffer tank of such a water consumer unit.

In a further variant, the aircraft can further comprise a flight attendant interface or input/output panel. Such interface/panel may allow entering certain information or set specific parameters by a flight attendant and/or a pilot. This allows setting a sleeping phase, or identifying the same when a cabin light is dimmed. The controller can then assume that the usage frequency of the monuments, particularly the lavatories, will decrease as the passengers remain in their seats. During such sleeping phase the controller may open the cross-feed valve and operate one of the plurality of conveying devices, to convey water to each of the water networks. This operating mode allows saving energy by operating only one conveying device.

In yet a further variant, the cross-feed valve can be opened/closed manually, i.e., based on a user command and/or irrespective of any sensor-controlled control of the valve. For example, a corresponding input may be made at the flight attendant panel.

The present disclosure is not restricted to the aspects and variants in the described form and order. Specifically, the description of aspects and variants is not to be understood as a specific limiting grouping of features. It is to be understood that the present disclosure also covers combinations of the aspects and variants. Thus, each variant or optional feature can be combined with any other aspect, variant, optional feature or even combinations thereof.

BRIEF DESCRIPTION OF THE DRAWINGS

In the following, the present disclosure will further be described with reference to exemplary implementations illustrated in the figures, in which.

DETAILED DESCRIPTION OF THE PREFERRED EMBODIMENTS

In the following description, for purposes of explanation and not limitation, specific details are set forth in order to provide a thorough understanding of the present disclosure. It will be apparent to one skilled in the art that the present disclosure may be practiced in other implementations that depart from these specific details.

Figure 1:
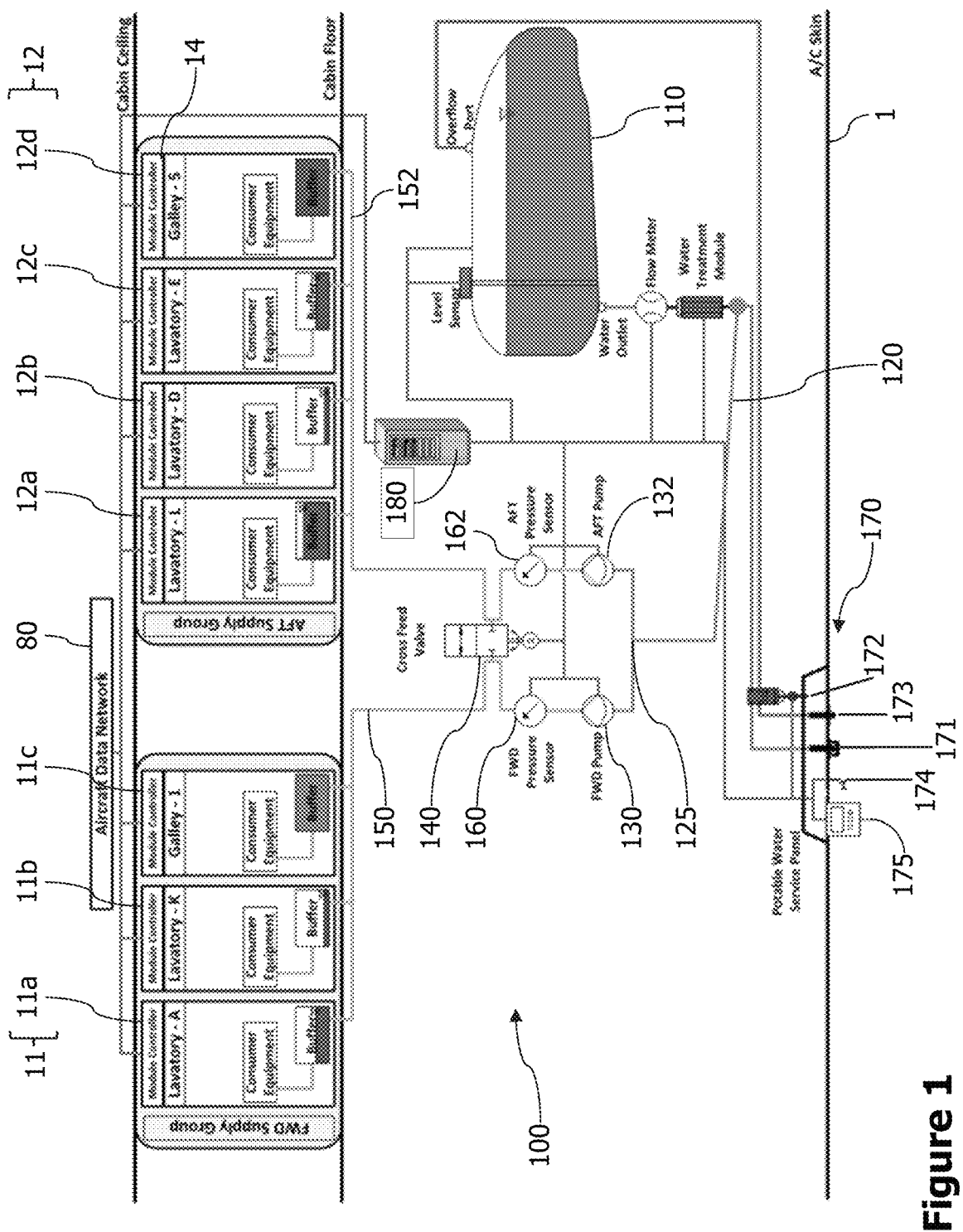
FIG. 1 schematically illustrates a water supply system.

FIG. 1 schematically illustrates a water supply system 100, such as a system 100 which can distribute (potable) water through an aircraft 1. The aircraft 1 is schematically illustrated as an outer skin of the aircraft (A/C skin=aircraft skin), wherein the aircraft further comprises a cabin floor and a cabin ceiling. This is not necessary for the present disclosure, but facilitates explanation of the arrangement of particular components of the water supply system and its water consumer units.

Specifically, in a lower region of the aircraft 1, such as a cargo or storage area underneath the cabin floor, the system comprises a main tank 110 configured to store a main supply of potable water. It is to be understood that more than one main tank 110 can be employed, but the drawings illustrate only one tank 110. The main tank 110 may be filled with potable water via a potable water service panel 170 arranged at or in the aircraft skin. This conventional service panel 170 is only briefly described. For instance, water can be filled into tank 110 via a fill/drain interface or nipple 171. The corresponding pipe or duct may be equipped with a fill/drain valve 172, in order to separate or connect the system 100 from the interfaces of the service panel 170. An overflow 173 allows filling the tank 110 with a maximum level of water. The service panel 170 may further be equipped with a door lock and/or handle 174 allowing opening and closing a service panel door, and a data interface 175 providing a connection port for a data exchange with the system 100.

In use, the water from the main tank 110 is guided through a main water pipe 120 connected to a water outlet of the main tank 110. If necessary, a water treatment module may be installed, such as a filter or the like, as well as a flow meter in order to determine or sense the amount of water removed from the main tank 110.

A furcation 125 divides the main water pipe 120 in a plurality of pipe branches. While FIG. 1 illustrates two branches downstream of the furcation 125, the present disclosure is not restricted to this number of pipe branches. Downstream of the furcation 125, each pipe branch forms one of a plurality of water networks 150, 152. Each water network 150, 152 is configured to conduct water from the one of the plurality of pipe branches to at least one of a plurality of water consumer units 11a-11c, 12a-12d. It is to be understood that each water network 150, 152 can have any desired topology. For example, one or more water network topologies can be employed, such as a stub-branch network (as illustrated), a circulation or ring pipe, individual supply lines or combinations thereof.

The water consumer units 11a-11c, 12a-12d can be arranged above the cabin floor, which facilitates draining of the water networks 150, 152 as well as the water consumer units 11a-11c, 12a-12d by gravity. For instance, the drain valve 172 may be opened, so that water runs driven by gravity through the pipes of the water networks 150, 152, through the furcation 125, the main water pipe 120 and the drain interface 171. Draining the water from the water supply system may be facilitated pneumatically, i.e., by blowing air through the pipes of the water supply system.

The system 100 further comprises in each of the plurality of water networks 150, 152 a conveying device 130, 132. Specifically, a first conveying device 130 is provided in a pipe branch downstream of furcation 125 and is configured to conduct water to each water consumer unit 11a-11c of a first group 11 of water consumer units 11a-11c via water network 150. A second conveying device 132 is provided in another pipe branch downstream of furcation 125 and is configured to conduct water to each water consumer unit 12a-12d of a second group 12 of water consumer units 12a-12d. Thus, each water network 150, 152 can be operated individually by providing pressurized water from the respective conveying device 130, 132, which receive water from the main tank 110 via main water pipe 120 and furcation 125.

Each of the first and second group 11, 12 can comprise any arbitrary number and any arbitrary type of water consumer units 11a-11c, 12a-12d. As a mere example, each of the groups 11, 12 comprises a plurality of lavatories 11a, 11b, 12a, 12b, 12c and one galley 11c, 12d. It is to be understood that a group 11, 12 of water consumer units 11a-11c, 12a-12d may also comprise only one water consumer unit 11a-11c, 12a-12d, may comprise only lavatories 11a, 11b, 12a-12c or may comprise only galleys 11c, 12d.

While FIG. 1 illustrates the first water consumer units group 11 in a front portion of the aircraft 1 and a second water consumer units group 12 in a back portion of the aircraft 1, the grouping of the water consumer units 11, 12 can be arbitrarily chosen. As a mere example, the water consumer units groups 11, 12 may likewise be arranged on the left-hand side of the aircraft 1 and a right-hand side of the aircraft 1, respectively. It is to be understood that also a combination of front/back and right/left grouping of water consumer units 11, 12 can be employed. In any case, one group 11, 12 of water consumer units 11a-11c, 12a-12d is associated with one water network 150, 152, which conducts water to the respective units 11a-11c, 12a-12d from the tank 110 by the respective conveying device 130, 132.

The water supply system further comprises a cross-feed valve 140 configured to fluidically connect or separate the plurality of water networks 150, 152 downstream of the conveying devices 130, 132 in the plurality of water networks 150, 152. In other words, the cross-feed valve 140 allows fluidically connecting or separating the pressurized portion of the respective water networks 150, 152. It is to be understood that the aircraft 1 can comprise more than the illustrated two water networks 150, 152. In this case, more than one cross-feed valve 140 can be employed. For instance, a pair of water networks 150, 152 can be fluidically connected to one another by one cross-feed valve 140, so that the number of cross-feed valves 140 could be N−1, where N is the number of water networks 150, 152. Alternatively, a plurality of cross-feed valves 140 is installed, so that one or more water networks 150, 152 is fluidically connected with at least one other water network 150, 152 and/or so that one cross-feed valve 140 fluidically connects more than two water networks 150, 152.

Referring back to FIG. 1, the pipes of the first and second water network 150, 152 are arranged in such a manner, that a portion thereof at the cross-feed valve 140 runs in an at least partially vertical direction. This allows draining the pipes of the first and second water network 150, 152 even at the cross-feed valve 140, so that no dead water remains after draining.

A controller 180 may be provided that can control the plurality of conveying devices 130, 132 and the cross-feed valve 140. The controller 180 can be coupled or connected to further controllers and/or sensors. For instance, each water consumer unit 11a-11c, 12a-12d may have a module controller configured for operating the water consumer of each unit 11a-11c, 12a-12d. Such module controller may indicate to controller 180 that water is required (e.g., when a faucet is used, a toilet is flushed or the like). The module controller and/or a sensor 14 may provide information to the controller 180 about a fill level in a buffer tank in at least one water consumer unit 11a-11c, 12a-12d. Finally, the water networks 150, 152 may further be equipped with a respective sensor, such as pressure sensors 160, 162.

The module controller(s) and/or sensor(s) 14, 160, 162 can be configured to determine a water supply requirement of at least one of the plurality of water consumer units 11a-11c, 12a-12d. They can further transmit a signal indicating the water supply requirement to the controller 180. It is to be understood that the module controller(s) and/or sensor(s) 14, 160, 162 can also transmit a signal to the controller 180, which indicates a current status of the water consumer equipment, the buffer tank, a pressure in the water network 150, 152 or the like, while the controller 180 determines the water supply requirement of the water consumer units 11a-11c, 12a-12d.

FIG. 1 additionally illustrates an aircraft data network 80, which may be connected to the module controllers of the water consumer units 11a-11c, 12a-12d. This configuration allows communication between the aircraft data network 80 and the controller 180, so that the controller 180 can determine the water supply requirement directly based on information derivable from the data network 80.

Based on the water supply requirement, the controller 180 may control the conveying devices 130, 132 and/or the cross-feed valve 140, in order to provide a sufficient amount of water to each of the water consumer units 11a-11c, 12a-12d.

For instance, the controller 180 may operate in different control modes depending on the current situation in the water supply system 100 of the aircraft 1. Some examples will be explained, such as closing the cross-feed valve 140 and operating each of the plurality of conveying devices 130, 132 in a normal mode. The normal mode refers to the operation of each conveying device 130, 132 in such a manner that it conveys an amount of water currently required by the respective water network 150, 152. In other words, this control mode reflects the general use of the water supply system 100.

In another control mode, the cross-feed valve 140 can be opened, while only one of the plurality of conveying devices 130, 132 is operated. Due to the fluidically connected water networks 150, 152 via cross-feed valve 140, the one conveying device 130 (or 132) conveys water to each of the water networks 150, 152. This control mode may be employed, if the overall water requirement is less than in the normal mode, so that energy can be saved by operating only one conveying device 130 (or 132). This control mode may also be employed, in case of failure of another conveying device 132 (or 130).

In a further control mode, the cross-feed valve 140 can be opened, while all conveying devices 130, 132 operate at a maximum conveying power. Alternatively, all or at least more than one conveying device 130, 132 operates at a high power level in this control mode. This control mode allows an increased water supply for one or more of the plurality of water consumer units 11a-11c, 12a-12d, such as filling one or more buffer tanks before a flight of the aircraft 1. Likewise, in case a plurality of lavatories are flushed at the same time, an increased water supply requirement may occur, so that this control mode may be employed.

In another control mode, the cross-feed valve 140 can be opened, while only one conveying device 130, 132 is operated. This allows a cross-check of sensors in the water networks 150, 152.

Yet another control mode may be employed in case of a leakage in one of the water networks 150, 152. In this case, the cross-feed valve 140 can be closed and the conveying device 130, 132 of the water network 150, 152 having the leakage is stopped. Thus, the water network 150, 152 having the leakage can be isolated from the water supply system 100.

In any case, the cross-feed valve 140 allows achieving redundancies in the water supply system 100 and additionally further advantageous control modes.

In addition, for the case that one of the conveying devices 130, 132 does not operate, the conveying devices 130, 132 are each configured to act as a check valve, in order to avoid a hydraulic circle. Alternatively or additionally, a check or shut-off valve (not illustrated) can be employed between the cross-feed valve 140 and the respective conveying device 130, 132.

Figure 2:
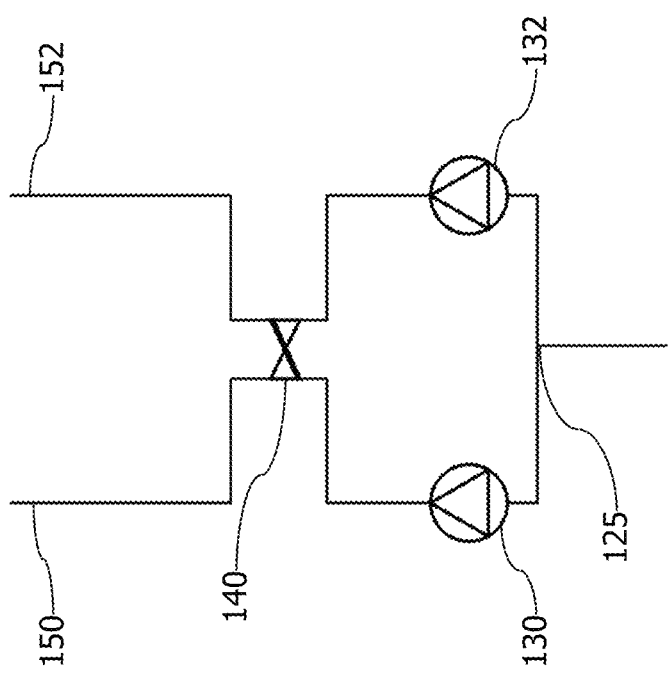
FIG. 2 schematically illustrates a portion of a water supply system comprising a cross-feed valve.

FIG. 2 schematically illustrates a portion of the water supply system 100 comprising a cross-feed valve 140, particularly the portion comprising the furcation 125 and parts of the water networks 150, 152 downstream of cross-feed valve 140. The cross-feed valve 140 can be implemented as a shutoff valve, particularly a single shutoff valve 140. The cross-feed valve 140 is connected to a portion of the pipes of the water networks 150, 152 that run substantially vertically, i.e., that has an arrangement including a vertical component. This allows draining the pipes by gravity. In addition, there is no dead end between the cross-feed valve 140 and a pipe of one of the water networks 150, 152. Thus, no water is kept in a dead-end pipe portion between a pipe of the water networks 150, 152 and the cross-feed valve 140. This increases the hygienic situation of the water supply system 100.

Figure 3:
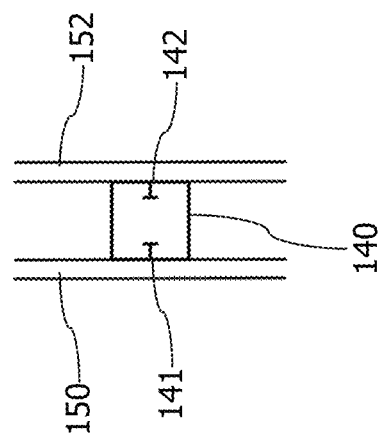
FIG. 3 schematically illustrates a detail of an exemplary cross-feed valve.

FIG. 3 schematically illustrates a detail of a cross-feed valve 140, such as the valve 140 of FIG. 2. Particularly, one shutoff valve 140 having a first port 141 and a second port 142 can be employed. The first port 141 is fluidically connected to a pipe of a first water network 150 of the plurality of water networks 150, 152, and the second port 142 is fluidically connected to a pipe of a second water network 152 of the plurality of water networks 150, 152. This allows conducting water through each of the water networks 150, 152, while providing an easy to implement possibility for fluidically interconnecting both water networks 150, 152.

As a mere example, each port 141, 142 is directly attached to an opening in the pipe of the respective water network 150, 152. Such direct attachment may be achieved by welding, adhering or a very short fitting.

The arrangement of FIG. 3 particularly facilitates unhindered flow of water in the water networks 150, 152. Specifically, if the cross-feed valve 140 is closed, the pipes of the respective water networks 150, 152 can function as usual pipes without significant influence on the water flow in the pipe.

Figure 4:
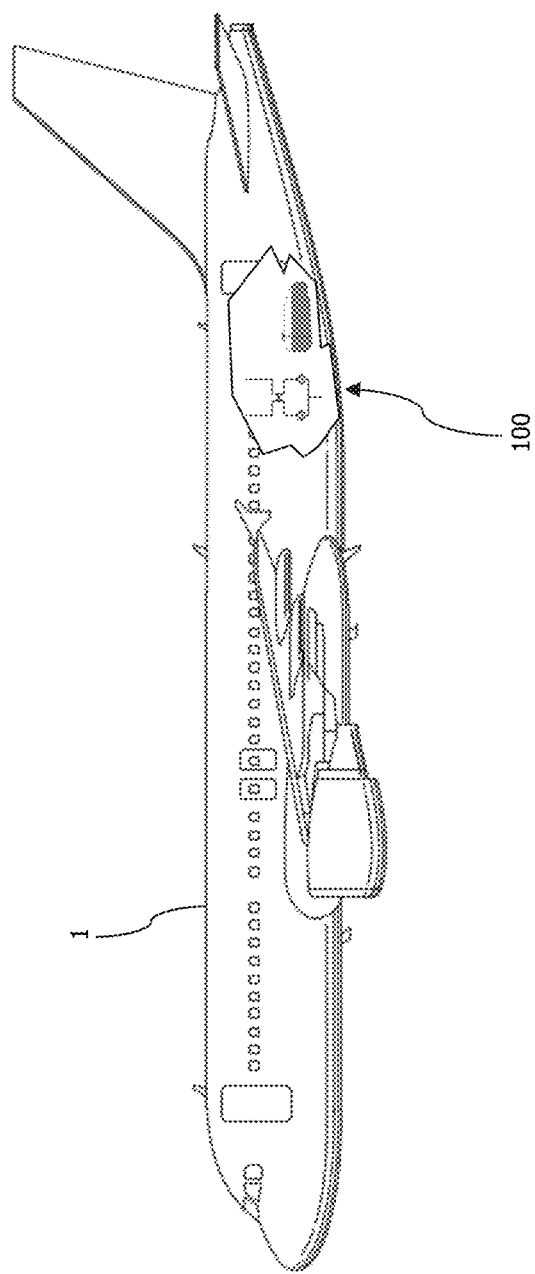
FIG. 4 schematically illustrates an aircraft.

FIG. 4 schematically illustrates an aircraft 1 comprising a water supply system 100. For instance, a water supply system 100 as illustrated and described with respect to FIGS. 1 to 3 can be installed in the aircraft 1. It is to be understood that a plurality of such water supply systems 100 can be installed.

The systems and devices described herein may include a controller, a module controller, control unit, control device, controlling means, system control, processor, computing unit or a computing device comprising a processing unit and a memory which has stored therein computer-executable instructions for implementing the processes described herein. The processing unit may comprise any suitable devices configured to cause a series of steps to be performed so as to implement the method such that instructions, when executed by the computing device or other programmable apparatus, may cause the functions/acts/steps specified in the methods described herein to be executed. The processing unit may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory may be any suitable known or other machine-readable storage medium. The memory may comprise non-transitory computer readable storage medium such as, for example, but not limited to, an electronic, magnetic, optical, electromagnetic, infrared, or semiconductor system, apparatus, or device, or any suitable combination of the foregoing. The memory may include a suitable combination of any type of computer memory that is located either internally or externally to the device such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. The memory may comprise any storage means (e.g., devices) suitable for retrievably storing the computer-executable instructions executable by processing unit.

The methods and systems described herein may be implemented in a high-level procedural or object-oriented programming or scripting language, or a combination thereof, to communicate with or assist in the operation of the controller or computing device. Alternatively, the methods and systems described herein may be implemented in assembly or machine language. The language may be a compiled or interpreted language. Program code for implementing the methods and systems described herein may be stored on the storage media or the device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein.

Computer-executable instructions may be in many forms, including program modules, executed by one or more computers or other devices. Generally, program modules include routines, programs, objects, components, data structures, etc., that perform particular tasks or implement particular abstract data types. Typically, the functionality of the program modules may be combined or distributed as desired in various embodiments.

It is believed that the advantages of the technique presented herein will be fully understood from the foregoing description, and it will be apparent that various changes may be made in the form, constructions and arrangement of the exemplary aspects thereof without departing from the scope of the disclosure or without sacrificing all of its advantageous effects. Because the technique presented herein can be varied in many ways, it will be recognized that the disclosure should be limited only by the scope of the claims that follow.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A water supply system for a plurality of water consumer units in an aircraft, the system comprising:
   a main tank configured to store a main supply of water;
   a main water pipe connected to an outlet of the main tank; and
   a plurality of water networks, each configured to conduct water from the main tank to at least one of the plurality of water consumer units,
   wherein the plurality of water consumer units is partitioned in a first group of water consumer units and at least a second group of water consumer units,
   wherein the first group of water consumer units comprises a first conveying device configured to convey water to each water consumer unit of the first group of water consumer units and the second group of water consumer units comprises a second conveying device configured to convey water to each water consumer unit of the second group of water consumer units, and
   a cross-feed valve configured to fluidically connect or separate the plurality of water networks downstream of the conveying devices in the plurality of water networks, and
   wherein the cross-feed valve fluidically connects the first group of water consumer units to the first conveying device, and fluidically connects the second group of water consumer units to the second conveying device, and fluidically separates the first group of water consumer units from the second conveying device, and fluidically separates the second group of water consumer units from the first conveying device.

2. The system of claim 1,
   wherein the cross-feed valve comprises one shut-off valve, and
   wherein a first port of the shut-off valve is fluidically connected to a pipe of a first one of the plurality of water networks and a second port of the shut-off valve is fluidically connected to a pipe of a second one of the plurality of water networks.

3. The system of claim 2, wherein each of the pipes of the first and second water network at the respective first and second port of the valve runs in an at least partially vertical direction allowing water to drain from the respective pipe by at least one of gravity or pneumatically.

4. The system of claim 2, wherein each of the pipes of the first and second water network is directly connected to the respective first port and respective second port of the shut-off valve substantially without forming a dead-end pipe when the shut-off valve is closed.

5. The system of claim 1, further comprising a controller configured to control the plurality of conveying devices and the cross-feed valve.

6. The system of claim 5, further comprising at least one sensor configured to determine a water supply requirement of at least one of the plurality of water consumer units and to transmit a signal indicating the water supply requirement to the controller.

7. The system of claim 5, wherein the controller is further configured to:
   close the cross-feed valve and operate each of the plurality of conveying devices in a normal mode, in which each of the plurality of conveying devices conveys an amount of water currently required by the respective water network, open the cross-feed valve and operate one of the plurality of conveying devices, to convey water to each of the water networks, open the cross-feed valve and operate each of the plurality of conveying devices at a maximum conveying power, when a maximum water supply requirement is determined at one of the plurality of water consumer units, open the cross-feed valve and operate at least one of the plurality of conveying devices, in order to perform a cross-check of sensors in the water networks, and close the cross-feed valve, if a leakage is determined in one of the water networks.

8. The system of claim 1, further comprising:
at least one furcation dividing the main water pipe in a plurality of pipe branches,
wherein each of the plurality of water networks branches off the main water pipe at one of the at least one furcation, and
wherein each conveying device is arranged in a respective one of the pipe branches downstream of a respective one of the at least one furcation.

9. An aircraft, comprising the system of claim 1.

10. The aircraft of claim 9, wherein the plurality of water consumer units comprises one or more lavatories and one or more galleys of the aircraft.

11. The aircraft of claim 9, further comprising:
a controller configured to control the plurality of conveying devices and the cross-feed valve, and
an aircraft data network configured to communicate with the controller.

12. A water supply system for a plurality of water consumer units in an aircraft, the system comprising:
a main tank configured to store a main supply of water;
a main water pipe connected to an outlet of the main tank; and
a plurality of water networks, each configured to conduct water from the main tank to at least one of the plurality of water consumer units,
wherein the plurality of water consumer units is partitioned in a first group of water consumer units and at least a second group of water consumer units, wherein each of the plurality of water networks comprises a conveying device configured to convey water to each water consumer unit of one of the groups of water consumer units,
a cross-feed valve configured to fluidically connect or separate the plurality of water networks downstream of the conveying devices in the plurality of water networks, and
a controller configured to control the plurality of conveying devices and the cross-feed valve;
wherein the controller is further configured to:
close the cross-feed valve and operate each of the plurality of conveying devices in a normal mode, in which each of the plurality of conveying devices conveys an amount of water currently required by the respective water network,
open the cross-feed valve and operate one of the plurality of conveying devices, to convey water to each of the water networks,
open the cross-feed valve and operate each of the plurality of conveying devices at a maximum conveying power, when a maximum water supply requirement is determined at one of the plurality of water consumer units,
open the cross-feed valve and operate at least one of the plurality of conveying devices, in order to perform a cross-check of sensors in the water networks, and
close the cross-feed valve, if a leakage is determined in one of the water networks.

* * * * *